(12) United States Patent
Burrow et al.

(10) Patent No.: US 8,770,506 B2
(45) Date of Patent: Jul. 8, 2014

(54) HIGH SEAL RETRACTOR PRETENSIONER PISTON

(75) Inventors: Jon Burrow, Ortonville, MI (US); Gerald Keller, Shelby Township, MI (US)

(73) Assignee: Autoliv ASP, Inc., Ogden, UT (US)

( * ) Notice: Subject to any disclaimer, the term of this patent is extended or adjusted under 35 U.S.C. 154(b) by 515 days.

(21) Appl. No.: 12/950,385

(22) Filed: Nov. 19, 2010

(65) Prior Publication Data

US 2012/0006926 A1    Jan. 12, 2012

Related U.S. Application Data

(63) Continuation-in-part of application No. 12/830,792, filed on Jul. 6, 2010.

(51) Int. Cl.
    *B60R 22/46* (2006.01)

(52) U.S. Cl.
    USPC ........................................... 242/374

(58) Field of Classification Search
    USPC ............ 242/374, 390.5, 390.6; 280/806, 807;
                  297/475–478, 480; 60/407, 632
    See application file for complete search history.

(56) References Cited

U.S. PATENT DOCUMENTS

| | | | | |
|---|---|---|---|---|
| 3,980,083 A | * | 9/1976 | Elliott | 604/88 |
| 4,234,108 A | * | 11/1980 | Diamond | 222/386 |
| 4,442,674 A | * | 4/1984 | Fohl | 60/632 |
| 4,444,010 A | * | 4/1984 | Bendler | 60/407 |
| 5,481,940 A | | 1/1996 | Betz | |
| 5,690,295 A | * | 11/1997 | Steinberg et al. | 242/374 |
| 5,871,236 A | | 2/1999 | Bauer | |
| 5,881,962 A | | 3/1999 | Schmidt | |
| 6,523,769 B2 | | 2/2003 | Hamaue | |
| 7,631,831 B2 | | 12/2009 | Hiramatsu | |
| 2003/0029953 A1 | * | 2/2003 | Matsumura | 242/374 |
| 2007/0262186 A1 | | 11/2007 | Hiramatsu | |
| 2010/0044489 A1 | | 2/2010 | Lombarte | |
| 2010/0276531 A1 | * | 11/2010 | Shiotani et al. | 242/374 |

FOREIGN PATENT DOCUMENTS

| | | |
|---|---|---|
| CN | 1736774 A | 2/2006 |
| CN | 100372710 C | 3/2008 |
| EP | 0 600 689 A1 | 6/1994 |
| EP | 0 755 340 B1 | 1/2000 |
| JP | 2005-306111 | 11/2005 |

OTHER PUBLICATIONS

U.S. Appl. No. 12/830,792, filed Jul. 6, 2010, Burrow.

* cited by examiner

*Primary Examiner* — Sang Kim
*Assistant Examiner* — Scott Haugland
(74) *Attorney, Agent, or Firm* — Brinks Gilson & Lione

(57) ABSTRACT

A pretensioner assembly for motor vehicle belt restraint systems is provided. The pretensioner assembly includes a tube in fluid communication with a gas generator. An elastic piston disposed within the tube is operable to drive a plurality of balls upon receiving pressurized gas discharged from the gas generator. The piston includes a proximal end and a distal end. The proximal end includes a flexible rim that expands upon receiving pressurized gas from the gas generator, and the distal end includes a flexible rim that expands in response to backpressure from the plurality of balls. The expansion of the flexible rims at the proximal and distal ends of the piston provides a tight seal between the piston and the inner peripheral wall of the tube.

9 Claims, 9 Drawing Sheets

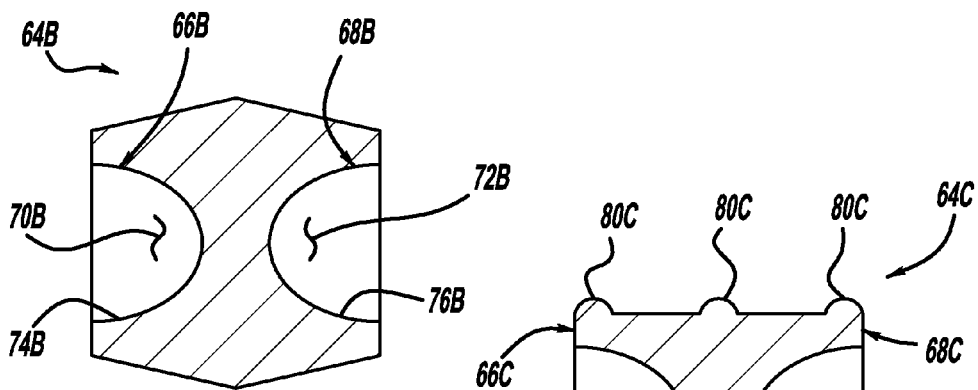
FIG - 7A
FIG - 7B
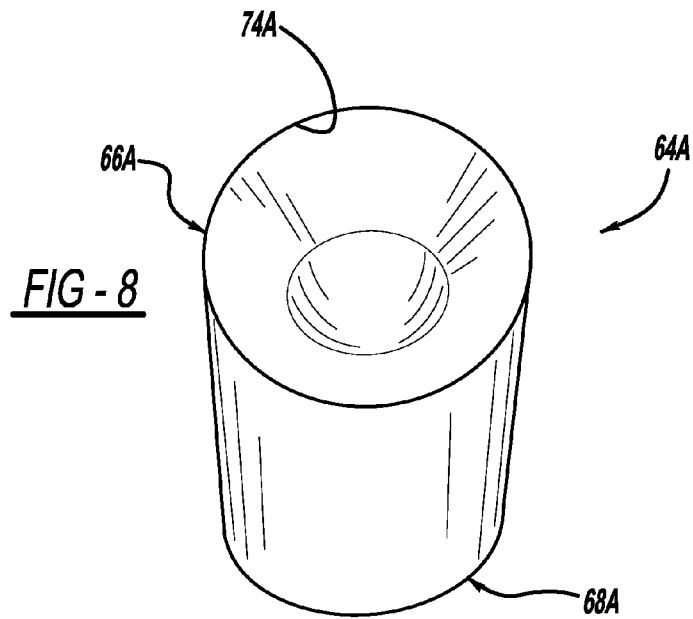
FIG - 8

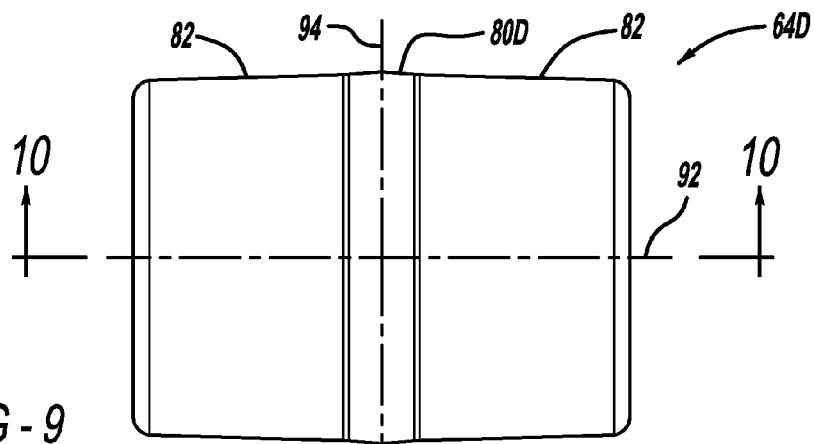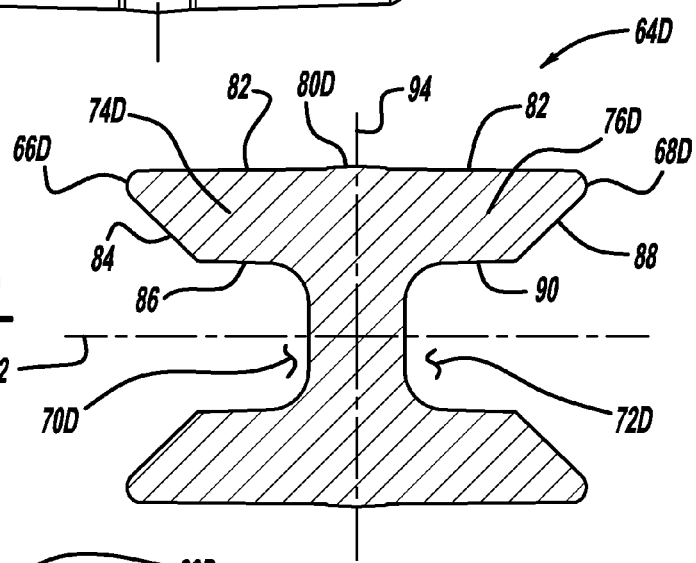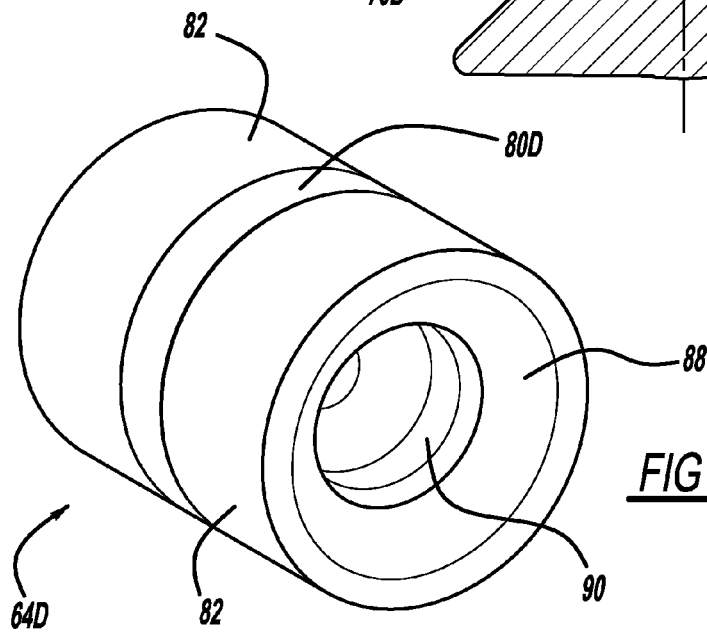

HIGH SEAL RETRACTOR PRETENSIONER PISTON

CROSS REFERENCE TO RELATED APPLICATIONS

This application is a continuation-in-part of prior application Ser. No. 12/830,792, filed Jul. 6, 2010, the entire contents of which are incorporated herein by reference.

FIELD OF THE INVENTION

The present invention relates generally to seatbelt restraint devices for restraining an occupant of a vehicle, and more particularly, to devices for pretensioning a seatbelt.

BACKGROUND OF THE INVENTION

Seatbelt restraint systems for restraining an occupant in a vehicle seat play an important role in reducing occupant injury in vehicle crash situations. Seatbelt restraint systems of the conventional so-called "3-point" variety commonly have a lap belt section extending across the seat occupant's pelvis and a shoulder belt section crossing the upper torso, which are fastened together or are formed by a continuous length of seatbelt webbing. The lap and shoulder belt sections are connected to the vehicle structure by anchorages. A belt retractor is typically provided to store belt webbing and may further act to manage belt tension loads in a crash situation. Seatbelt restraint systems which are manually deployed by the occupant (so-called "active" types) also typically include a buckle attached to the vehicle body structure by an anchorage. A latch plate attached to the belt webbing is received by the buckle to allow the belt system to be fastened for enabling restraint, and unfastened to allow entrance and egress from the vehicle. Seatbelt systems, when deployed, effectively restrain the occupant during a collision.

OEM vehicle manufacturers often provide seatbelt restraint systems with pretensioning devices, which tension the seatbelt either prior to impact of the vehicle (also known as a "pre-pretensioner") or at an early stage of a sensed impact to enhance occupant restraint performance. The pretensioner takes out slack in the webbing and permits the belt restraint system to couple with the occupant early in the crash sequence. One type of pretensioner acts on the webbing retractor to tension the belt. Various designs of retractor pretensioners presently exist, including a type known as a roto-pretensioner that incorporates a gas generator for generating a pyrotechnic charge. Examples of such roto-pretensioners are described in U.S. Pat. No. 5,881,962, U.S. patent application Ser. No. 11/115,583, and U.S. patent application Ser. No. 12/830,792, which are commonly owned by the assignee of the present application and are hereby incorporated by reference in their entirety for all purposes. Generally, ignition of the pyrotechnic charge or other combustible material creates gas pressure in a chamber having a piston to impart motion upon a driving element such as a piston, rack, or series of balls disposed in a pretensioner tube, which engage with and wind a retractor spool sprocket to retract the webbing.

One issue with pretensioners utilizing gas generators is efficient utilization of the gas volume produced by the generator. For instance, a significant volume of the gas produced by the gas generator can leak through the pretensioner tube or around the piston or balls, thereby decreasing the pressure and force available for pretensioning the seat belt.

BRIEF SUMMARY OF THE INVENTION

The present invention provides a pretensioner assembly that substantially reduces gas leakages within a pretensioner tube. The pretensioner assembly includes a pretensioner tube in communication with a gas generator. A driving element in the form of a piston having a generally cylindrical outer surface is disposed within the tube. The piston is operable to impart motion onto driving a element such as a plurality of balls loaded in the tube (or a "ball string") in reaction to pressurized gas discharged from the gas generator. The piston includes a proximal end spaced from the gas generator so as to define a gas chamber therebetween. The piston further includes a distal end facing the plurality of balls. Portions of the proximal end and the distal end are indented inward to form concave depressions at each end.

The concave depressions include flexible rims that act as pressure-activated seals. More specifically, the flexible rim at the proximal end is configured to expand circumferentially outward in response to forces exerted by the pressurized gas from the gas generator, and the flexible rim at the distal end is configured to expand circumferentially outward due to the application of backpressure from the plurality of balls. The expansion of the flexible rims at the proximal and distal ends create a tight seal between the piston and an inner peripheral wall of the tube, thereby reducing gas leakage beyond the distal end of the piston.

Further objects, features, and advantages of the invention will become apparent to those skilled in the art to which the present invention relates from consideration of the following description and the appended claims, taken in conjunction with the accompanied drawings.

BRIEF DESCRIPTION OF THE DRAWINGS

The drawings described herein are for illustration purposes only and are not intended to limit the scope of the present disclosure in any way.

FIGS. 7A and 7B are perspective views of a piston according to alternative embodiments the present invention;

FIG. 8 is an isometric view of a piston according to one aspect of the present invention.

FIG. 9 is a side view of a piston according to a further embodiment of the present invention;

FIG. 10 is a cross-sectional side view of the piston of FIG. 9;

FIG. 11 is a perspective view of the piston of FIG. 9;

It should be understood that throughout the drawings, corresponding reference numerals indicate like or corresponding parts and features.

DETAILED DESCRIPTION OF THE INVENTION

The following description is merely exemplary in nature and is not intended to limit the present disclosure or its application or uses.

Figure 1:
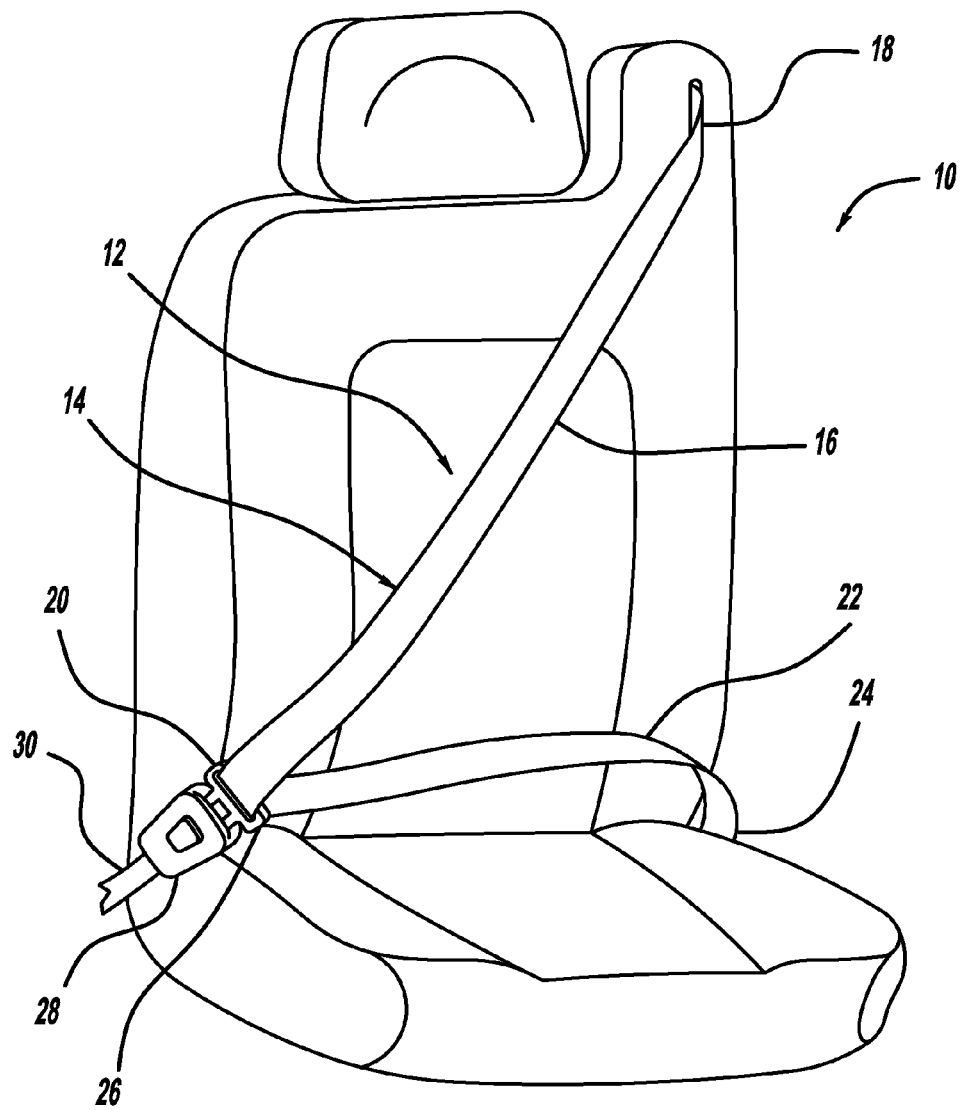
FIG. 1 is a perspective view of a vehicle seat and a seat belt assembly coupled with each other.

Referring now to the drawings, FIG. 1 shows a vehicle seat 10 and a seat belt assembly 12. The seat belt assembly 12 includes a seat belt webbing 14 having a shoulder belt portion 16 extending from an upper anchorage 18 to a buckle loop 20 and a lap belt portion 22 extending from the buckle loop 20 to an anchor point 24. A buckle latch plate 26 is able to be inserted into a seat belt buckle 28 to lock and unlock the seat belt assembly 12. A seat belt buckle cable 30, either directly or in cooperation with other components, secures the seat belt buckle 28 to a portion of the vehicle frame.

The seat belt webbing 14 is able to pay-out from a retractor 32 assembly (shown in FIGS. 2 and 3), which is located within the vehicle seat 10 (in an integrated structural seat design) or is coupled structurally to the vehicle body, so that the effective length of the seat belt webbing 14 is adjustable. When the buckle latch plate 26 has been fastened to the seat belt buckle 28, the seat belt assembly 12 defines a three-point contact between the upper anchorage 18, the buckle latch plate 26, and the anchor point 24. Any other suitable configurations, such as alternative locations for the retractor assembly 32, the buckle latch plate 26, and the anchor point 24, may be used with the present invention.

Figure 2:
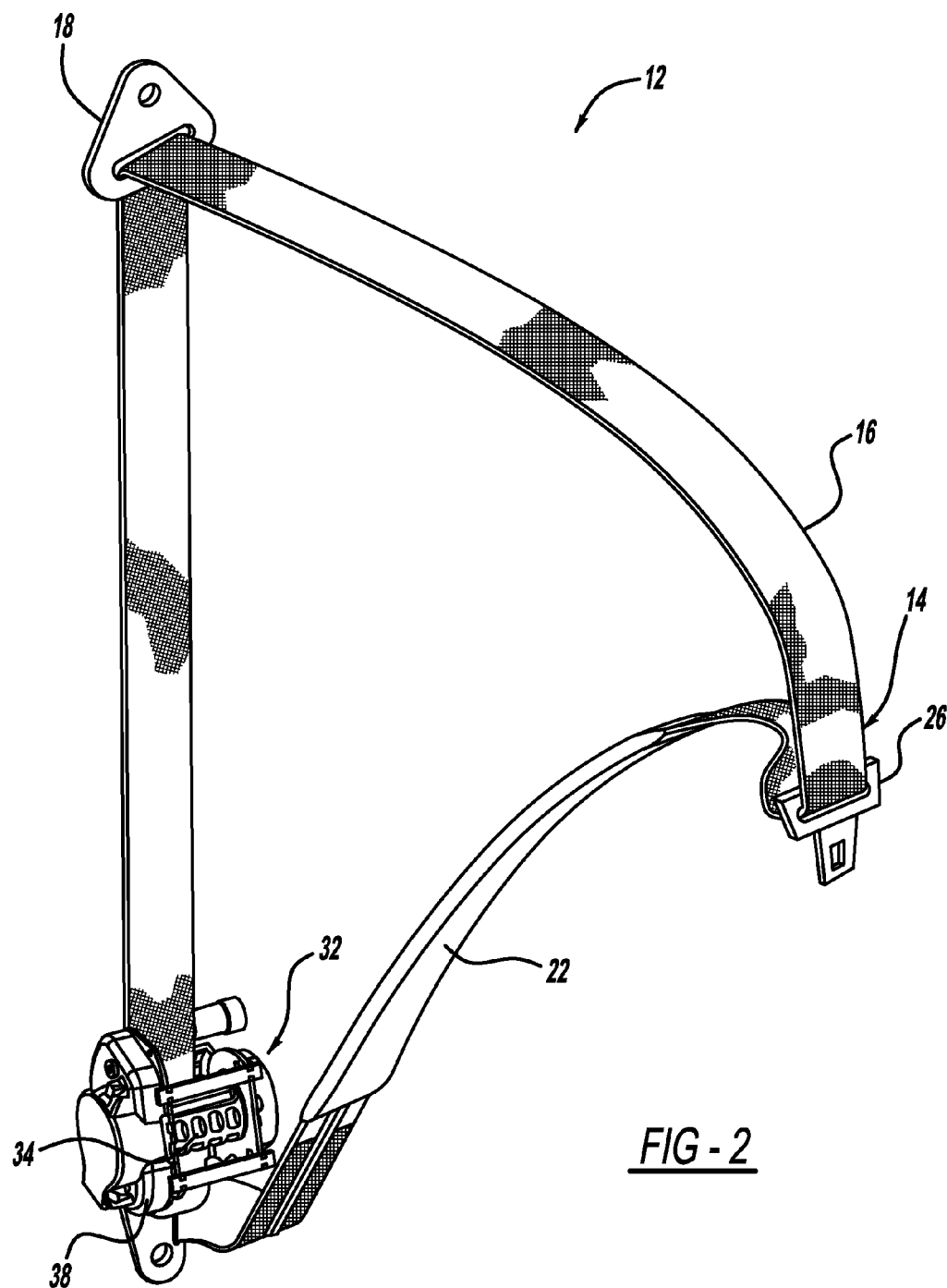
FIG. 2 is an isometric view of the seat belt assembly of FIG. 1.

Now with reference to FIG. 2, an isometric view of the seat belt assembly 12 of the present invention is illustrated disassociated from the motor vehicle and showing a spool retractor assembly 32. The retractor assembly 32 includes a spool assembly 34 and a gas generator 36 (shown in FIG. 3) mounted to a common frame 38. The spool assembly 34 is connected with and stows the webbing 14 of the shoulder belt portion 16, whereas the end of the lap belt portion 22 of the webbing 14 is fixedly engaged with the anchorage point, for example, the frame 38 or another portion of the motor vehicle such as the seat 10.

Figure 3:
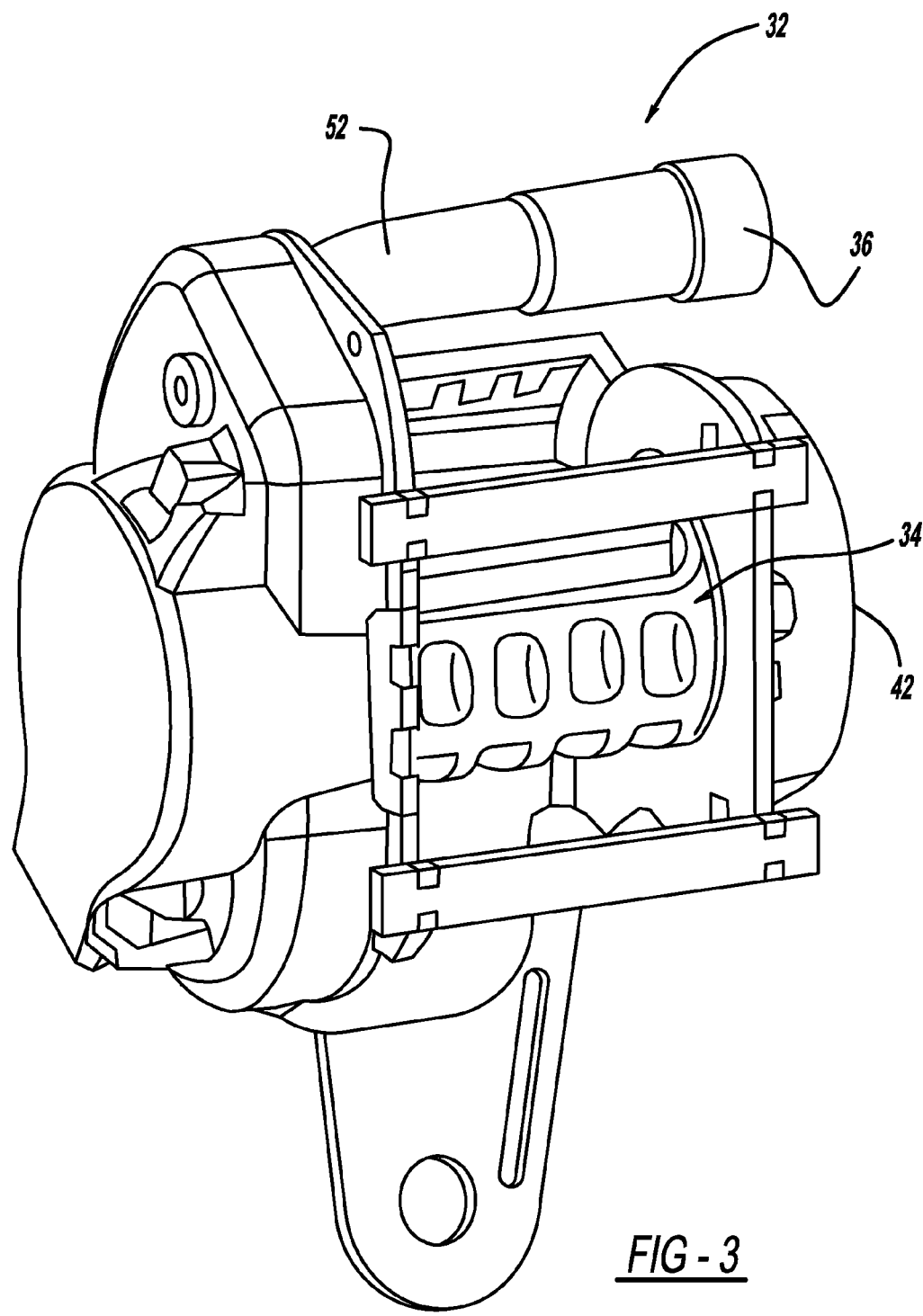
FIG. 3 an isometric view of a retractor assembly shown in FIG. 2.

As best shown in FIG. 3, the spool assembly 34 engages the shoulder belt portion 16 of the webbing 14 and rotates to wind-up or pay-out the belt webbing 14. A torsional "clock" or "motor" type spring is carried within a spring end cap 42 and rotationally biases the spool assembly 34 to retract the webbing 14. The spool assembly 34 may further incorporate other spool control mechanisms which are known in accordance with the prior art, including pretensioners, inertia and webbing sensitive locking devices, or other belt control devices. "Spool control systems" referred to in this specification may include any system which controls the rotational movement of a webbing spool, thus controlling the extraction and retraction of seat belt webbing. Spool locking devices typically incorporate an inertia sensitive element, such as a rolling ball or pendulum, and cause a sprocket of the spool to be engaged to prevent further withdrawing of webbing from the spool assembly 34. Webbing sensitive locking devices sense rapid pay-out of webbing to lock the retractor. Various electronic sensing mechanisms which detect the withdrawal of webbing and/or the connection of the tongue 26 to the buckle 28 may also be incorporated into the retractor assembly 32.

During normal operation of the vehicle, the retractor assembly 32 allows pay-out of seat belt webbing 14 to give the occupant a certain amount of freedom of movement. However, if an impact or a potential impact situation is detected, the retractor assembly 32 is locked to prevent pay-out and to secure the occupant in the seat 10. For example, if the vehicle decelerates at a predetermined rate or if the brakes are actuated with a predetermined force, then the retractor assembly 32 is locked. Due in part to the free pay-out of the seat belt webbing 14, the seat belt assembly 12 often develops slack during normal use.

The retractor assembly 32 further incorporates a pretensioner system 44 (shown in FIG. 4) operatively connected to rotate the spool assembly 34 for pretensioning. As known to those of skill in the art, a retractor pretensioner winds seat belt webbing into a more taught condition against the occupant at the initial stages of a detected vehicle impact. This is provided to reduce forward motion or excursion of the occupant in response to the deceleration forces of a vehicle impact or rollover.

The pretensioner system 44 includes a pretensioner tube 52 in communication with the gas generator 36. The gas generator 36 is used to provide expanding gas in response to a firing signal. As is known in the art, for example, the vehicle includes a sensor sending a signal indicative of an emergency event such as an impact event, crash, or rollover. The vehicle sensor may be a specific impact sensor, or may be a traditional vehicle sensor (e.g. a longitudinal or lateral acceleration sensor) or otherwise part of a control system having a suite of multiple sensors. Any other impact sensor that is or will be known to those skilled in the art may also be readily employed in conjunction with the seat belt assembly 12 of present invention. An electronic control unit such as a central processing unit (CPU) or other controller receives a signal and controls the seat belt assembly 12 to respond by tightening the seatbelt of the vehicle (e.g. via activation of a pretensioner).

Figure 4:
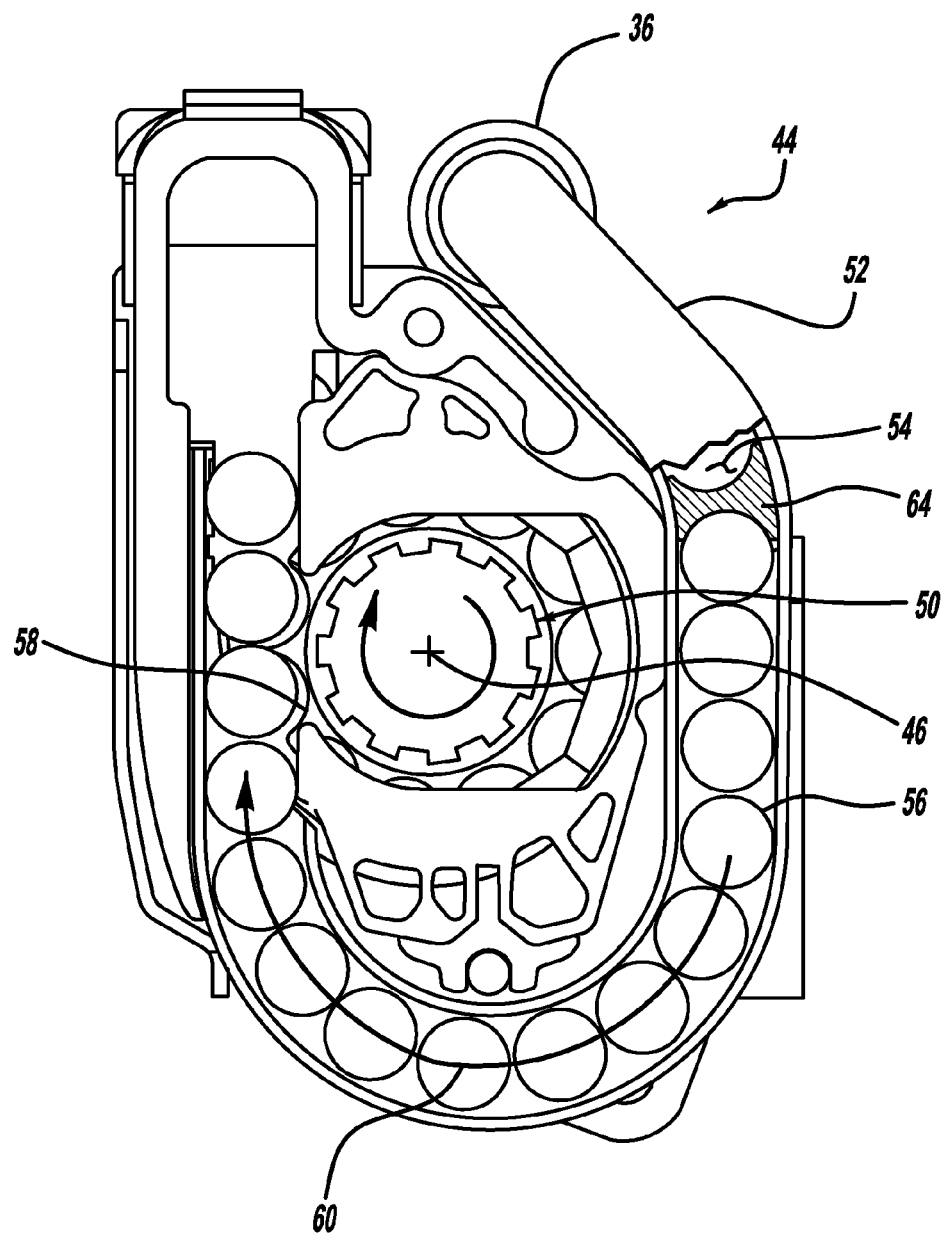
FIG. 4 is a side elevational view of a pretensioner assembly in accordance with the present invention with portions cut away.

FIG. 4 provides a cut-away illustration of the pretensioner tube 52 acting on the belt spool assembly 34. As shown in the cut-away illustration, the pretensioner tube 52 includes a plurality of ball bearings or internally stored balls 56 composed of any suitable material such as a metal (e.g., aluminum or steel) or polymer (e.g., polyester and/or rubber). The tube 52 further includes a piston 64 having a cylindrical outer surface, as best shown in FIG. 8. The piston 64 is slidably disposed within the tube 52 and is operable to drive the balls 56 along an actuating path 60. As will be understood by those of skill in the art, the piston 64 may be press-fitted or otherwise fitted inside the tube 52.

As will be discussed in greater detail below, the piston 64 defines a generally elastic structure, and may be composed of various materials (or combinations of materials) known in the art, such as any suitable plastic or polymer (e.g., polyester, rubber, thermoplastic, or other elastic, deformable, or non-deformable material). Moreover, the piston 64 may be die cast, forged, or molded from metal, plastic, or other suitable material. In one aspect of the present invention, the piston 64 may be formed as a composite structure composed of different materials assembled together.

In operation, the gas generator 36 produces expanding gas that pressurizes the gas chamber 54, thereby enabling the piston 64 to forcibly drive the balls 56 along the actuation path 60. As the balls 56 are driven through tube 52, they engage a spool sprocket assembly 50 that is rotatable about an axis 46. The spool sprocket assembly 50 forms bearing seats 58 that are semi-spherical depressions with an appropriate shape and size to receive the balls 56. Engagement of the balls 56 with the spool sprocket assembly 50 as they are driven by expanding gas in the direction of arrow 60 causes the spool assembly 34 to rotate, which in turn provides pretensioning. Of course, it should be understood that while the pretensioner system 44 employs balls 56 for rotating the spool assembly 34, the pretensioner system 44 may use any suitable driving element known in the art.

Figure 5A:
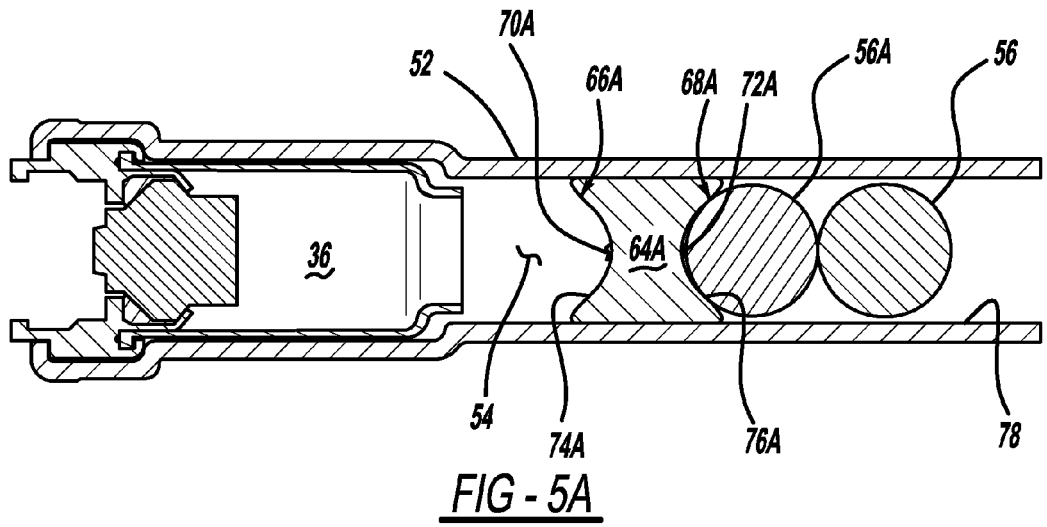
FIGS. 5A and 5B are enlarged partial side views of a section of the pretensioner assembly of FIG. 4.
Figure 5B:
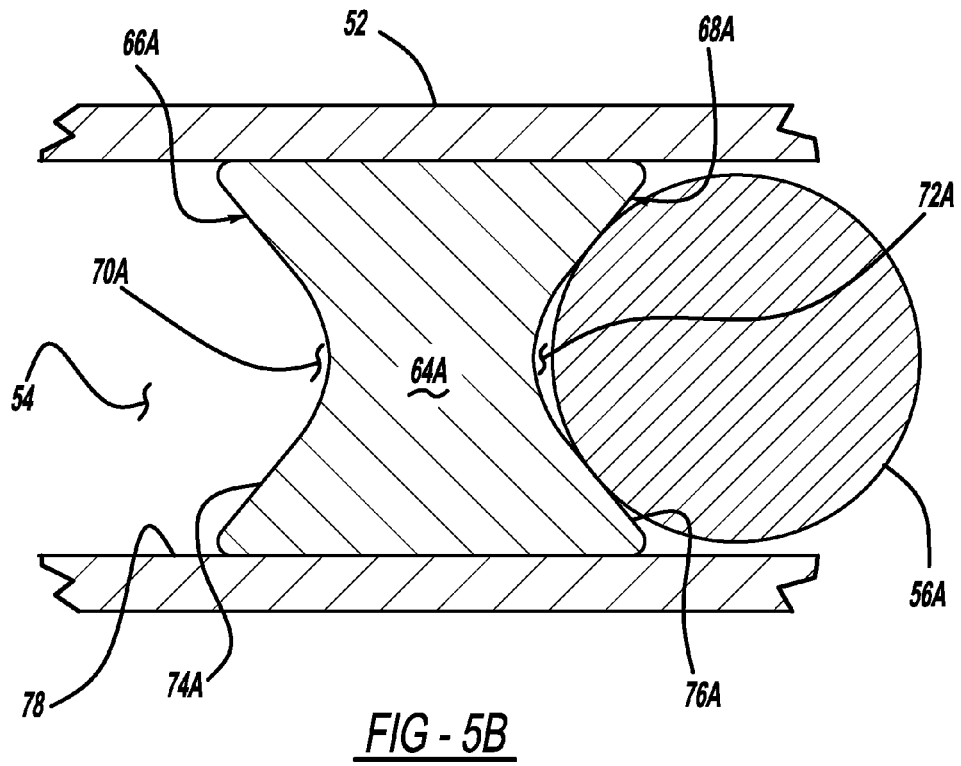

Referring now to FIGS. 5A and 5B, in a first embodiment the piston 64A forms a proximal end 66A spaced from the gas generator 36 so as to define a gas chamber 54 between the gas generator 36 and the piston 64A. The piston 64A further forms a distal end 68A adjacent to the lead ball 56A of the plurality of balls 56. The proximal end 66A and the distal end 68A are each indented inward so as to define semi-spherical recesses or concave depressions 70A and 72A, forming rims 74A and 76A at opposite ends of the piston 64A.

Figure 6A:
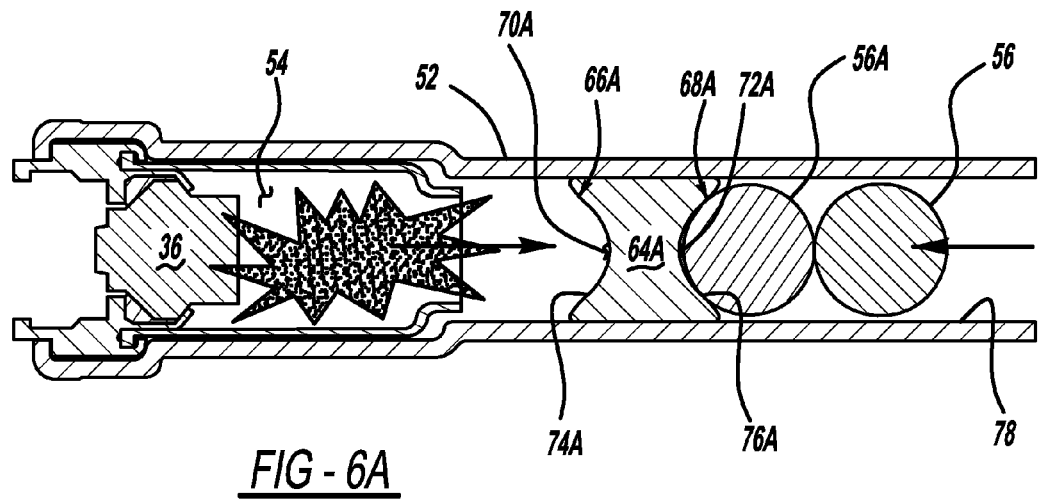
FIGS. 6A and 6B are enlarged side views of the pretensioner assembly showing operation of the pretensioner assembly.
Figure 6B:
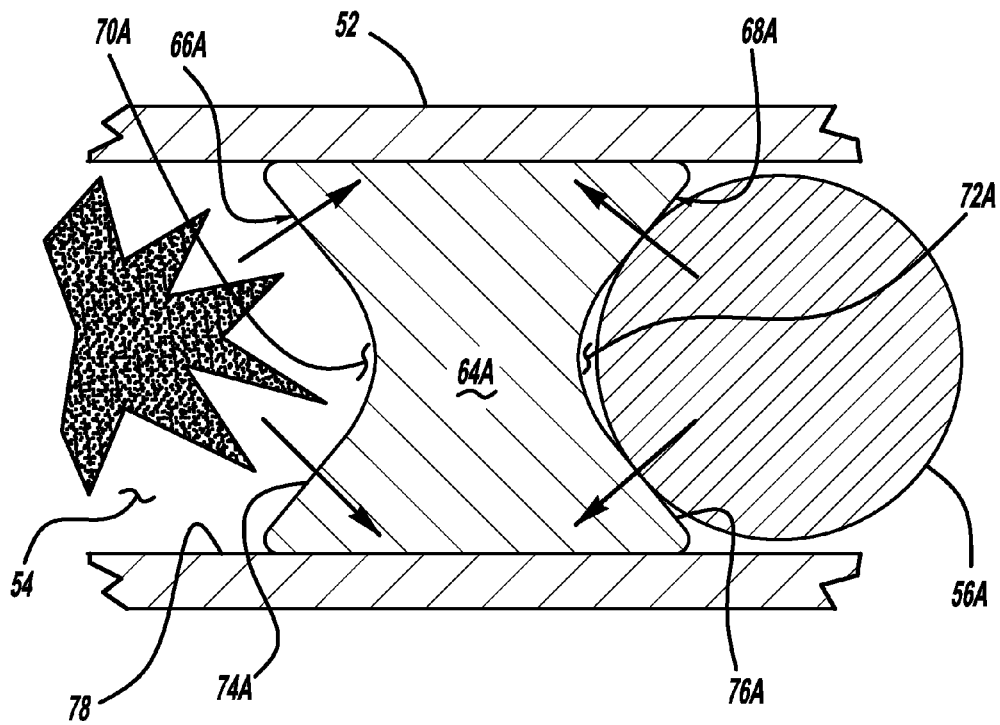
Figure 12:
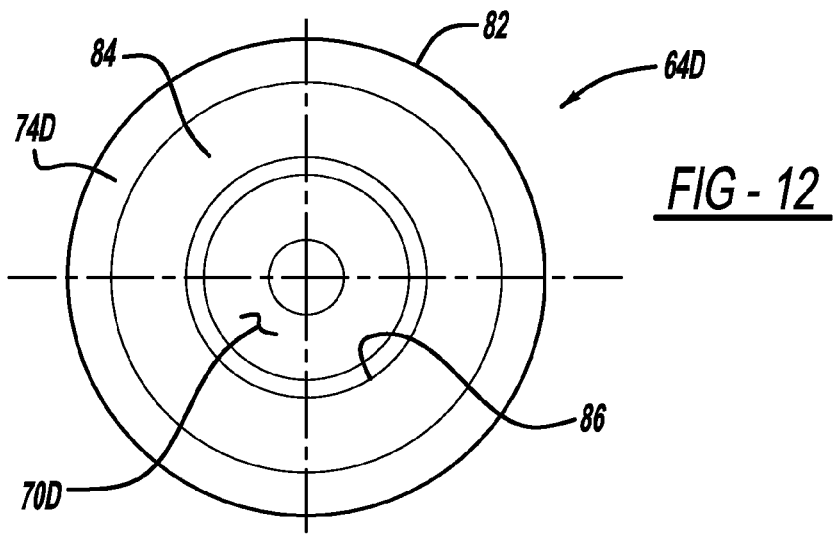
FIG. 12 is a proximal end view of the piston of FIG. 9.

Referring now to FIGS. 6A and 6B, it can further be seen that activation of the gas generator 36 enables the piston 64A to resist gas leakage. As previously mentioned, the piston 64A is composed of a relatively elastic material. Therefore, pressurized gas within the gas chamber 54 causes the proximal end 66A of the piston 64A to expand, which helps prevent gas from escaping past the piston 64A. More specifically, the concave depression 70A at the proximal end 66A forms a flexible rim 74A that expands circumferentially outward in response to pressurized gas. Hence, the rim 74A at the proximal end 66A functions as a pressure-activated gas seal that enables the piston 64A to utilize the pressure of the trapped gas in order to force the balls 56 forward.

In addition, backpressure generated from the balls 56, and specifically the interaction between the lead ball 56A and the distal end 68A of the piston 64A, causes the flexible rim 76A formed by the concave depression 72A at the distal end 68A of the piston 64A to expand circumferentially outward. The expansion of the rims 74A and 76A at the proximal and distal ends 66A and 68A of the piston 64A provide a tightened seal between the outer cylindrical surface of the piston 64A and the inner peripheral wall 78 of the pretensioner tube 52. Accordingly, the piston 64A of the present invention is operable to retain a high seal pressure as well as maintain residual gas pressure within the tube 52.

Moreover, the piston 64A may be shaped such that the concave depression 72A at the distal end 68A of the piston 64A has a diameter that is smaller than the diameter of the lead ball 56A, as shown in FIGS. 5B and 6B. Accordingly, the lead ball 56A may apply greater pressure at certain points of the concave depression 72A that enhance the outward expansion of the rim 76A formed at the distal end 68A.

In addition, while the concave depressions 70A and 72A are shown in the drawings as having a semi-spherical shape, it is to be understood that the concave depressions 70A and 72A may be of any suitable shape that enables the rims 74A and 76A to expand outward and form seals with the inner peripheral wall 78 of the pretensioner tube 52. Furthermore, since both rims 74A and 76A are operable to form seals, the piston 64A may be shaped such that only one of the rims 74A or 76A is provided. That is, either the proximal end 66A or the distal end 68A may be indented inward to form a single concave depression 70A or 72A having a rim 74A or 76A.

It should be understood that while the piston 64 includes a generally cylindrical exterior, the piston 64 may include a variety of shapes. For instance, in some embodiments, the piston 64 may be shaped so that contact between certain areas of the piston 64 and the inner peripheral wall 78 of the tube is maximized upon expansion of the piston. In the second, third, and fourth embodiments of the piston 64, except where otherwise noted, features having like numeric designations to features in the first embodiment (e.g., 66B and 66A) will be understood as having similar characteristics to the features in the first embodiment.

As shown in FIG. 7A, in a second embodiment the piston 64B may include an outer surface having a diameter that gradually decreases from the center towards the proximal and distal ends 66B and 68B. The increased center diameter helps provide additional sealing between the central exterior surface of the piston 64B and the inner peripheral wall 78 of the pretensioner tube 52.

Alternatively, as shown in FIG. 7B, in a third embodiment the piston 64C may include a generally flat outer surface having discrete seal beads 80C formed at specific areas such as the center and outer ends of the piston 64C.

Referring now to FIGS. 9-12, in a fourth embodiment the piston 64D has an outer surface comprising two truncated generally conical surfaces 82 joined at a common base. The common base coincides with a central transverse plane of the piston 64D. The piston 64D further comprises a discrete seal bead 80D protruding circumferentially outward from the outer surface at the central transverse plane of the piston 64D. The discrete seal bead 80D may alternatively protrude from other portions of the outer surface. As in other embodiments, the piston 64D of the further embodiment preferably is formed of an elastic material to promote good sealing performance as it moves within the pretensioner tube 52. The piston 64D may be composed of various materials (or combinations of materials) known in the art, such as any suitable plastic or polymer (e.g., polyester, rubber, thermoplastic rubber or polyester, thermoplastic polyurethane, or other elastic, deformable, or non-deformable material).

As shown in FIG. 10, the piston 64D may be shaped such that the proximal concave depression 70D includes a proximal section having a generally conical surface 84 and a distal section having a generally cylindrical surface 86. As discussed above, the proximal concave depression 70D forms a flexible rim 74D. Moreover, the distal concave depression 72D may include a distal section having a generally conical surface 88 and a proximal section having a generally cylindrical surface 90. As discussed above, the distal concave depression 72D forms a flexible rim 76D. Notably, the "proximal" and "distal" designations are relative to the direction of installation of the piston 64D in the pretensioner tube. In some further embodiments, discussed below, the symmetrical construction of the piston 64D renders such designations arbitrary.

Preferably, the piston 64D defines two elements of symmetry. First, the piston 64D preferably has a longitudinal axis of symmetry 92. The axis of symmetry 92 preferably coincides with the axes of the generally conical surfaces 84 and 88, with the axes of the generally cylindrical surfaces 86 and 90, and with the axes of the truncated generally conical surfaces 82. Second, the piston 64D preferably has a plane of symmetry 94, which bisects, and lies perpendicular to, the longitudinal axis of symmetry 92. The plane of symmetry 94 coincides with the central transverse plane of the piston 64D. These two symmetry elements define two degrees of freedom for the installation of the piston 64D in the pretensioner system 44, minimizing the risk of error in the assembly of the pretensioner system 44. In other words, the piston 64D can be installed with either of its ends facing balls 56, and can also be installed in any position of rotation about axis 92.

In the preferred embodiment just described, the outer surface of the piston 64D has a varying radius about the longitudinal axis of symmetry 92. The radius of the outer surface generally decreases from the central transverse plane of the piston 64D to the proximal and distal ends 66D and 68D of the piston 64D. The decreased radius at the ends of the piston 64D provides a clearance between the ends of the piston 64D and the inner peripheral wall 78 of the pretensioner tube 52, further facilitating installation of the piston 64D.

Figure 13:
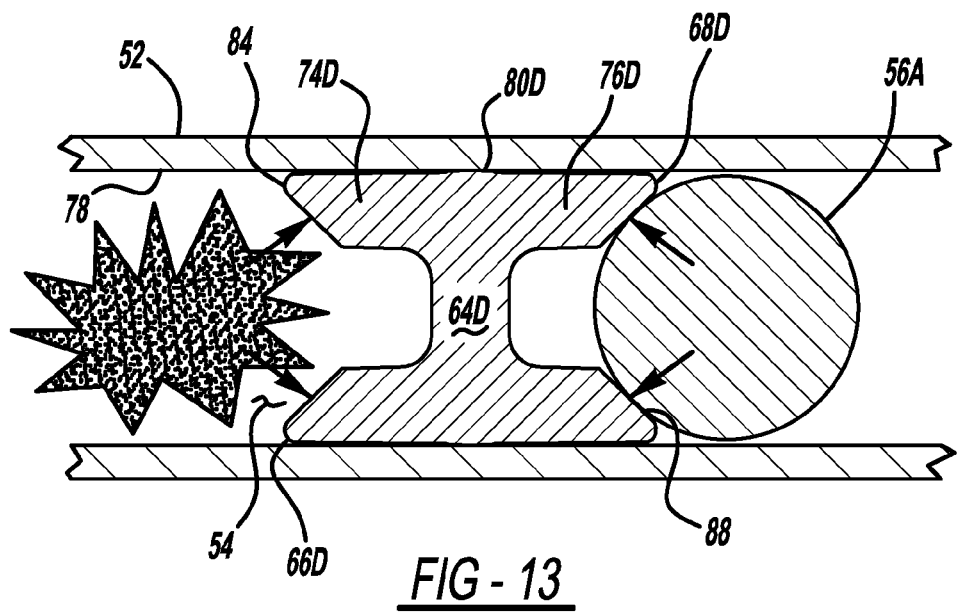
FIG. 13 is an enlarged partial side view of the pretensioner assembly of FIG. 4, including the piston of FIG. 9, showing operation of the pretensioner assembly.

In operation, the structural characteristics of the piston 64D enable the piston 64D to form a gas seal with the inner peripheral wall 78 of the pretensioner tube 52. First, the discrete seal bead 80D forms a contact seal with the inner peripheral wall 78 of the pretensioner tube 52. Second, as shown in FIG. 13, pressurized gas within the gas chamber 54 exerts a force on generally conical surface 84 as indicated by the vector arrows in FIG. 13. This force causes the flexible rim 74D to expand circumferentially outward, forming a pressure-activated gas seal between the proximal end 66D of the piston 64D and the inner peripheral wall 78 of the pretensioner tube 52. Third, as also shown in FIG. 13, the interaction of the lead ball 56A with the generally conical surface 88 exerts a force on generally conical surface 88 as indicated by the vector arrows in FIG. 13. This force causes the flexible rim 76D to expand circumferentially outward, forming a gas seal between the distal end 68D of the piston 64D and the inner peripheral wall 78 of the pretensioner tube 52. Finally, the elastic structure of the piston 64D enables the piston 64D to conform to the inner peripheral wall 78 of the pretensioner tube 52 and to maintain the gas seals described above despite changes in the shape or inner diameter of the inner peripheral wall 78 of the pretensioner tube 52.

As a person skilled in the art will readily appreciate, the above description is meant as an illustration of the implementation of the principles of this invention. This description is not intended to limit the scope or application of this invention in that the invention is susceptible to modification, variation, and change, without departing from the spirit of this invention as defined in the following claims.

The invention claimed is:

1. A pretensioner assembly for retracting a seatbelt webbing of a motor vehicle, the pretensioner assembly comprising:
    a bent tube;
    a gas generator for producing gas conducted within the tube; and
    a piston disposed within the tube and operable to drive a driving element upon receiving pressurized gas discharged from the gas generator, the piston having a proximal end facing the gas generator, a distal end facing the driving element, a central transverse plane located between the proximal end and the distal end, and an outer surface, the proximal end and the distal end each having a portion indented inward to respectively define a proximal concave depression and a distal concave depression, the proximal concave depression forming a proximal flexible rim that expands circumferentially outward when the pressurized gas from the gas generator enters the proximal concave depression, the expansion of the proximal flexible rim forming a proximal seal for resisting gas leakage beyond the proximal end of the piston, the distal concave depression forming a distal flexible rim that expands circumferentially outward when backpressure from the driving element is applied to the distal concave depression, the expansion of the distal flexible rim forming a distal seal for resisting gas leakage beyond the distal end of the piston;
    wherein the outer surface comprises two truncated generally conical surfaces, wherein the truncated generally conical surfaces have a common base, and wherein the common base coincides with the central transverse plane of the piston the piston having a larger outer diameter in the central transverse plane than in any transverse plane intersecting one of the proximal concave depression and the distal concave depression, the diameter of the surface of the piston in the central transverse plane providing sealing between the piston and the tube, wherein the proximal flexible rim, the distal flexible rim, and the common base form a temporary triple seal in the tube when exposed to the pressurized gas and to the backpressure from the driving element.

2. The pretensioner assembly of claim 1, wherein the piston includes a discrete seal bead protruding from the outer surface of the piston in the central transverse plane.

3. The pretensioner assembly of claim 2, wherein the discrete seal bead forms a contact seal with the tube for preventing gas from leaking beyond the central transverse plane of the piston.

4. The pretensioner assembly of claim 1, wherein the piston is composed of an elastic polymer.

5. The pretensioner assembly of claim 1, wherein the driving element includes a plurality of balls operable to rotate a spool for pretensioning the seatbelt webbing.

6. The pretensioner assembly of claim 1, wherein the proximal concave depression includes a proximal section and a distal section, the proximal section forming a generally frustoconical space, and the distal section forming a generally cylindrical space.

7. The pretensioner assembly of claim 1, wherein the distal concave depression includes a distal section and a proximal section, the distal section forming a generally frustoconical space, and the proximal section forming a generally cylindrical space.

8. The pretensioner assembly of claim 1, wherein the piston includes a longitudinal axis of symmetry and a plane of symmetry, the plane of symmetry formed by the central transverse plane bisecting the longitudinal axis of symmetry.

9. The pretensioner assembly of claim 8, wherein the outer surface has a radius about the longitudinal axis of symmetry, and wherein the radius of the outer surface generally decreases from the central transverse plane to the proximal and distal ends of the piston.

* * * * *